United States Patent
Wigdorski et al.

(12)

(10) Patent No.: US 6,683,147 B2
(45) Date of Patent: Jan. 27, 2004

(54) METHOD FOR THE PRODUCTION OF GLASS OR PLASTIC LAMINATES BY USE OF A CURABLE BLEND OF AN EPOXY RESIN AND A HIGH TG POLYMER

(75) Inventors: Robert M. Wigdorski, Red Lion, PA (US); Michael J. Zajaczkowski, York, PA (US); Kevin J. McKinney, Glen Rock, PA (US)

(73) Assignee: Adhesives Research, Inc., Glen Rock, PA (US)

( * ) Notice: Subject to any disclaimer, the term of this patent is extended or adjusted under 35 U.S.C. 154(b) by 0 days.

(21) Appl. No.: 10/389,813

(22) Filed: Mar. 18, 2003

(65) Prior Publication Data
US 2003/0168166 A1 Sep. 11, 2003

Related U.S. Application Data

(62) Division of application No. 09/876,094, filed on Jun. 8, 2001.

(51) Int. Cl.[7] .................................................. B32B 17/10
(52) U.S. Cl. ............................. 526/329.6; 525/326.9; 428/413; 428/415; 428/426; 428/442; 526/264; 526/266; 526/273; 526/328.5
(58) Field of Search ................................ 526/264, 266, 526/273, 328.5, 329.6; 428/413, 415, 426, 442; 525/329.6

(56) References Cited

U.S. PATENT DOCUMENTS

| | | | |
|---|---|---|---|
| 3,787,380 A | | 1/1974 | Stamberger |
| 3,857,905 A | | 12/1974 | Blackley et al. |
| 4,454,179 A | * | 6/1984 | Bennett et al. ................ 428/41 |
| 4,812,541 A | | 3/1989 | Mallya et al. |
| 5,270,416 A | | 12/1993 | Toman et al. |
| 5,639,811 A | | 6/1997 | Plamthottam et al. |
| 5,723,191 A | | 3/1998 | Plamthottam et al. |
| 5,760,153 A | * | 6/1998 | Epple et al. ................. 526/318 |
| 5,883,193 A | * | 3/1999 | Karim ......................... 525/113 |
| 6,121,355 A | * | 9/2000 | Tsunemine et al. ......... 524/270 |
| 6,200,639 B1 | | 3/2001 | Duecoffre et al. |
| 6,489,387 B2 | * | 12/2002 | Mallya et al. ............... 524/394 |
| 2001/0003765 A1 | | 6/2001 | Mallya et al. |
| 2002/0004135 A1 | * | 1/2002 | Buccellato et al. ......... 428/355 |
| 2003/0022980 A1 | * | 1/2003 | Foreman et al. ............ 524/504 |

FOREIGN PATENT DOCUMENTS

| WO | WO 91/04151 A1 | 4/1991 |
|---|---|---|
| WO | WO 97/11996 A1 | 3/1997 |

* cited by examiner

*Primary Examiner*—Helen L. Pezzuto
(74) *Attorney, Agent, or Firm*—Birch, Stewart, Kolasch & Birch, LLP

(57) ABSTRACT

A method for the production of glass or plastic laminates is provided comprising applying between opposing faces of glass or plastic substrates a pressure sensitive adhesive comprised of a curable blend of an epoxy resin and a polymer comprised of the polymerization reaction product of an alkyl (meth)acrylate monomer whose homopolymer has a Tg>20° C., optionally a $C_{1-30}$ (meth)acrylate monomer, a nitrogen-containing polar monomer, and a polymerizable epoxy-containing monomer, with the monomers being present in an amount such that the copolymer has a Tg>50° C., and curing the adhesive.

16 Claims, No Drawings

METHOD FOR THE PRODUCTION OF GLASS OR PLASTIC LAMINATES BY USE OF A CURABLE BLEND OF AN EPOXY RESIN AND A HIGH TG POLYMER

This application is a divisional of co-pending Application Ser. No. 09/876,094, filed on Jun. 8, 2001, the entire contents of which are hereby incorporated by reference and for which priority is claimed under 35 U.S.C. §120.

BACKGROUND OF THE PRESENT INVENTION

The present invention is directed to a high Tg acrylic polymer and an epoxy-blend thereof for use as a pressure sensitive adhesive.

Liquid crystal displays are used in many applications such as but not being limited to computer screens, calculator screens, telephone displays, electronic game displays and the like. Such displays are commonly manufactured utilizing liquid epoxy adhesives to form the perimeter seal for the display component containing the liquid crystal material. Epoxy resins have conventionally been used due to the structural stability and resistance to chemical attack. Such liquid epoxy adhesives, although acceptable for this purpose, require specialized mixing and dispensing equipment to apply the adhesive to the perimeter of the components to be bonded. The respective components must also be maintained in place during subsequent curing of the epoxy. It is a further disadvantage that the curing step requires undesirably high temperatures for undesirably long periods of time. The use of such high curing temperatures prohibits use of heat-sensitive plastics in the production of the displays. While glass substrates are not heat-sensitive, manufacturers desire to replace glass components of liquid crystal displays with plastic components. It would thus be desirable to provide an alternative method and adhesive composition for use in manufacturing liquid crystal displays or for adhering heat-sensitive plastic materials. It would also be desirable to provide an adhesive for use in the lamination of glass or plastic substrates, such as in the production of wave guides which are comprised of multiple layers of glass or plastic, which adhesive can be used in lieu of liquid adhesives and which may be thermocured at desirable temperatures.

OBJECTS AND SUMMARY OF THE PRESENT INVENTION

It is accordingly an object of the present invention to provide an adhesive composition that may be used as a perimeter seal in the production of liquid crystal displays.

It is accordingly a further object of the present invention to provide an adhesive composition that may be used to bond heat-sensitive plastic materials.

It is still further an object of the present invention to provide a method for the production of a liquid crystal display or other visual display devices by use of an improved adhesive composition.

In accordance with the present invention, there is thus provided a high Tg acrylic polymer comprised of the polymerization reaction product of the following monomers:

(1) an alkyl (meth)acrylate monomer whose homopolymer has a Tg>20° C.;
(2) optionally a $C_{1-30}$ (meth)acrylate monomer;
(3) a nitrogen-containing polar monomer; and
(4) an epoxy-containing monomer, said monomers being present in an amount such that the Tg of said polymer is greater than 50° C.

In accordance with the present invention, there is further provided a pressure sensitive adhesive comprised of a thermocurable blend of an epoxy resin and a high Tg acrylic polymer comprised of the polymerization reaction product of the following monomers:

(1) an alkyl (meth)acrylate monomer whose homopolymer has a Tg>20 C.;
(2) optionally a $C_{1-30}$ (meth)acrylate monomer;
(3) a nitrogen-containing polar monomer; and
(4) an epoxy-containing monomer, said monomers being present in an amount such that the Tg of said polymer is greater than 50° C.

The adhesive of the present invention may be used with advantage in the production of liquid crystal display (as a perimeter seal) or in the production of other optical devices such as wave guides where the adhesive is used to bond together multiple layers of glass or plastic upon being applied to substantially the entire opposing surface of the glass or plastic substrates, and subsequently being thermally cured.

In a preferred embodiment, the alkyl (meth)acrylate monomer is t-butyl methacrylate monomer, the $C_{1-30}$ (meth) acrylate monomer is a $C_{4-18}$ (meth)acrylate monomer, the nitrogen-containing polar monomer is an N-vinyl lactam monomer, and the epoxy-containing monomer is a glycidyl monomer.

DETAILED DESCRIPTION OF THE PRESENT INVENTION

The thermocurable pressure sensitive adhesive of the present invention is comprised of a blend of an epoxy resin and a high Tg acrylic copolymer.

The novel high Tg acrylic copolymer of the present invention is comprised of the polymerization reaction product of an alkyl (meth)acrylate monomer whose homopolymer has a Tg>20° C., optionally a $C_{1-30}$ (meth)acrylate monomer, a nitrogen-containing polar monomer, and an epoxy-containing monomer, each as defined below. The monomers are present in an amount such that the Tg of the resulting polymer is greater than 50° C.

The alkyl (meth)acrylate monomer may be selected from but not limited to the group consisting of t-butyl (meth) acrylate, hexadecyl acrylate, isobornyl (meth)acrylate, cyclododecyl acrylate, methyl methacrylate, secondary butyl methacrylate, ethyl methacrylate, cyclohexyl methacrylate and mixtures thereof.

The optional $C_{1-30}$ (meth)acrylate monomer used in the present invention may comprise a monomeric (meth)acrylic acid ester of a non-tertiary alcohol wherein the alcohol portion has from 4 to 18 carbon atoms. Exemplary (meth) acrylate monomers include but are not limited to esters of (meth)acrylic acid with non-tertiary alcohols such as 1-butanol, 1-pentanol, 2-pentanol, 3-pentanol, 2-methyl-1-butanol, 1-methyl-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol, etc.

Exemplary monomeric (meth)acrylate monomers having a carbon chain of at least 12 carbon atoms include but are not limited to lauryl acrylate ($C_{12}$), tridecylacrylate ($C_{13}$), myristyl acrylate ($C_{14}$), palmityl acrylate ($C_{16}$) and stearyl acrylate ($C_{18}$). Such monomers are well-known to those skilled in the art.

The at least one nitrogen-containing polar monomer may be selected from a wide range of suitable monomers. Such monomers include, for example, vinyl monomers having at least one nitrogen atom. Such monomers include but are not limited to N-mono-substituted acrylamides, such as a (meth)acrylamide, N-methylacrylamide, N-ethylacrylamide, N-methylolacrylamide, N-hydroxyethylacrylamide and diacetone acrylamide; N,N-disubstituted acrylamides such as N,N-dimethylacrylamide, N,N-diethylacrylamide, N-ethyl-N-aminoethylacrylamide, N-ethyl-N-hydroethylacrylamide, N,N-dimethylolacrylamide, and N,N-dihydroxyethylacrylamide, etc.

Exemplary nitrogen-containing monomers may also include but are not limited to N-vinyl lactam monomers such as N-vinyl-2-pyrrolidone, 5-methyl-N-vinyl-2-pyrrolidone, 5-ethyl-N-vinyl-2-pyrrolidone, 3,3-dimethyl-N-vinyl-2-pyrrolidone, 3-methyl-N-vinyl-2-pyrrolidone, 3-ethyl-N-vinyl-2-pyrrolidone; 4-methol-N-vinyl-2-pyrrolidone; 4-ethyl-N-vinyl-2-pyrrolidone; N-vinyl-2-valerolactam; N-vinyl-2-caprolactam; N-vinyl-2-piperidone; and N,N-dimethylacrylamide and mixtures of any of the foregoing. The corresponding allyl derivatives thereof are also suitable for use in the present invention. The noted lactams may also be substituted in the lactam ring by one or more lower alkyl groups having from 1 to 4 carbon atoms, with methyl, ethyl, or propyl groups being particularly preferred. The N-vinyl lactam monomer employed preferably comprises N-vinyl-2-pyrrolidone.

The polymerizable epoxy-containing monomer may be selected from a variety of vinyl-terminated epoxy-containing monomers. Exemplary polymerizable monomers include but are not limited to glycidyl esters of an α,β-ethylenically unsaturated carboxylic acid, such as (meth)acrylic or crotonoic acid.

Exemplary glycidyl monomers for use in the present invention accordingly include but are not limited to glycidyl (meth)acrylate, glycidyl ethacrylate and glycidyl itaconate, acryl glycidyl ether, (meth)allyl glycidyl ether and 3,4-epoxy-1-vinylcyclohexane.

The alkyl (meth)acrylate monomer is present in the copolymerizable reactant mixture in an amount ranging from about 20 to 80 percent by weight, the polymerizable $C_{1-30}$ (meth)acrylate monomer is present in the mixture in an amount ranging from about 0 to 50 percent by weight, the nitrogen-containing polar monomer is present in the mixture in an amount ranging from about 5 to 50 percent by weight, and the polymerizable epoxy-containing monomer is present in the mixture in an amount ranging from about 5 to 50 percent by weight. The epoxy-containing monomer is preferably present in an amount greater than 15 percent by weight.

Other monomers in addition to the above monomers may be optionally included for reasons such as cost reduction, etc. For example, styrene and vinyl acetate may be incorporated into the copolymer with advantage. Such monomers, if present, will be employed in amounts such that the resulting copolymer will still have a Tg greater than 50° C.

The alkyl (meth)methacrylate monomer is present together with the nitrogen-containing monomer in an amount such that the resulting copolymer exhibits a Tg>50° C., and preferably at least 60° C. The polymer does not exhibit pressure sensitive adhesive properties. However, the polymer finds particular utility when blended with an epoxy resin to form a thermocurable pressure sensitive adhesive.

The high Tg polymer of the present invention can be prepared by any suitable reaction technique such as free radical initiation techniques in the presence of a solvent. Exemplary solvents include but are not limited to ethyl acetate, cyclohexane, ketones or mixtures thereof. Solids content during polymerization may typically range from about 40% to 60%. Exemplary free radical initiators include but are not limited to peresters, acyl peroxides and those of the azo type, such as 2,2'-azobis(isobutyronitrile), benzoyl peroxide, lauroyl peroxide, t-butyl perbenzoate, t-butyl peroxypivalate, dibenzyl peroxydicarbonate, and diisopropyl peroxydicarbonate. Ultraviolet light and ionizing radiation may also be employed. The free radical initiator is generally present in the reaction mixture in an amount ranging from 0.01 to 10% by wt. based on the total weight of the monomers in the reaction mixture.

Typical polymerization temperatures range from 20° C. to 150° C. for periods of time of from 2 to 24 hours until the desired degree of conversion occurs. The resulting polymer will preferably exhibit a molecular weight in the range of 50,000 to 2,000,000 and be substantially non-tacky in nature.

U.S. Pat. No. 6,200,639 discloses at column 8, lines 25–36 a copolymer of glycidyl methacrylate and t-butyl methacrylate, optionally in association with an aromatic vinyl-functional monomer, one or more hydroxyl-functional (meth)acrylic monomers and one or more additional monomers.

U.S. Pat. No. 5,723,191 discloses a tackified dual cure pressure sensitive adhesive comprised of a copolymer having an acrylic backbone, a glycidyl monomer, an unsaturated carboxylic acid monomer, and a vinyl lactam monomer, together with a tackifier.

U.S. Pat. No. 3,787,380 discloses a copolymer of N-vinyl or N-allyl heterocyclic monomers, and unsaturated ester monomer and a glycidyl monomer.

U.S. Pat. Nos. 4,812,541 and 5,639,811 disclose a pressure sensitive adhesive copolymer comprised of a N-vinyl lactam monomer, a glycidyl monomer and an alkyl (meth)acrylate monomer.

U.S. Pat. No. 5,270,416 discloses a thermosetting powder comprised of a glycidyl monomer, a methyl (meth)acrylate, butyl acrylate and styrene.

U.S. Pat. No. 3,857,905 discloses a thermosetting coating composition comprised of a glycidyl monomer, a lower alkyl acrylate and a methyl acrylate.

In order to form a thermocurable pressure sensitive adhesive, the resulting high Tg polymer is blended with an epoxy resin in an amount sufficient to plasticize/tackify the high Tg copolymer in order to yield a blend having pressure sensitive adhesive properties.

The epoxy resin which is blended with the high Tg polymer has at least one oxirane epoxy group per molecule having the formula:

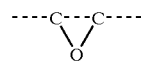

Such compounds may comprise without limitation polyglycidyl ethers of polyhydric phenols, di- or polynuclear phenols, polyphenols, etc. Such resins are disclosed in U.S. Pat. Nos. 4,501,853 and 3,397,254, herein incorporated by reference.

Glycidyl ether monomers of the formula

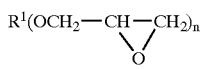

where $R^1$ is alkyl or aryl and n is an integer of from 1 to 6 are also suitable for use as the epoxy resin. Exemplary epoxy resins but are not limited to glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol)-propane). One skilled in the art can readily determine the identity of such compounds. Reference is also made to the disclosure of U.S. Pat. Nos. 3,117,099 and 3,018,262, herein incorporated by reference.

Exemplary epoxy resins are commercially available from a variety of sources including but not limited to bisphenol type A epoxy resins, urethane modified bisphenol A type epoxy resins, novolak type epoxy resins, cresol novolak type epoxy resins, alicyclic type epoxy resins, bisphenol S epoxy resins, hydrogenated bisphenol A epoxy resins, and aliphatic epoxy resins, glycidyl functional silicone resins, glycidyl functional acrylic resins, reaction products of bisphenol with epichlorohydrin, hydrogenated bisphenols with epichlorohydrin, polyglycidyl esters of polycarboxylic acids, polyglycidyl esters of carboxylic acids, etc. The above epoxy resins are available from a variety of commercial sources as described in U.S. Pat. No. 6,180,726, herein incorporated by reference.

Preferably, the epoxy resins are prepared by reaction of epichlorohydrin and a suitable bisphenol such as bisphenol A or bisphenol F to form an epoxy resin having the desired molecular weight. Preferably, the epoxy resin has an epoxide equivalent of 178–2500. The epoxide equivalent is the grams of resins containing one gram equivalent of epoxide. Exemplary epoxy resins include but are not limited to EPON 1004 and EPON 1007. Epoxy adducts of butadiene acrylonitrile elastomer may also be incorporated to improve flexibility.

The epoxy resin and the high Tg polymer are blended together by any suitable means such as mechanical mixing using a propeller-type mixing blade. The epoxy resin and the high Tg polymer are admixed in a weight ratio ranging from about 1.0:0.1 to about 1:2, respectively. Preferably, the epoxy resin and the high Tg polymer are present in a weight ratio of from 1:0.5 to 1:1.25, most preferably in a weight ratio of 1:1.

The copolymer/epoxy blend further comprises a curing agent having a sufficiently low activation temperature such that the blend may be thermocured at a temperature sufficiently low to be below the degradation temperature of plastic components conventionally employed in the production of a liquid crystal display device. A curing agent is combined with the epoxy resin prior to addition of the high Tg polymer when forming the blend. Exemplary curing agents dicyanamides, imidazoles, ketamines, modified amines and substituted ureas, dicarboxylic acids, mercaptans, acid anhydrides, dihidrizide compounds, polyfunctional amines, and cationic UV cure photoinitiators.

Any conventional solvent/diluent may be admixed with the copolymer/epoxy blend to permit coating of the thermocured blend at a sufficiently low viscosity. Exemplary solvents/diluents include but are not limited to xylene, toluene, butylacetate, acetone, methyl ethyl ketone, methyl isobutyl ketone, alcohols such as methanol, ethanol, propanol, butanol; ethylene glycol monomethyl ether, ethylene glycol monobutyl ether acetate, ethylene glycol monoethyl ether acetate, ethylene glycol monomethyl ether, ethylene glycol dibutyl ether; hexane, mineral spirits, and other aliphatic, cycloaliphatic or aromatic hydrocarbon solvents and other esters, ethers, ketones and alcohols, or mixtures thereof.

The resulting blend may be coated onto a backing material by any conventional manner, such as by roll coating, spray coating, or extrusion coating, etc. by use of conventional extrusion devices. The blend may be applied together with a solvent and the solvent subsequently removed to leave the tacky adhesive layer on the backing material. Typically, the blend will comprise about 60% by wt. solids. The resulting material will generally have less than about 0.5% by weight of solvent.

Exemplary backing materials include but are not limited to flexible and inflexible backing materials conventionally employed in connection with pressure sensitive adhesives. Such materials include creped paper, kraft paper, fabrics (knits, non-wovens, wovens), foil and synthetic polymer films such as polyethylene, polypropylene, polyvinyl chloride, poly(ethylene terephthalate), and cellulose acetate, as well as glass, ceramics, metallized polymer films and other composite sheet materials.

In another embodiment, the adhesive may be applied between two release substrates or on a 2 side coated differential release substrate to form a transfer adhesive.

The pressure sensitive adhesive composition of the present invention has been found to have particular applicability for use in connection with the lamination of layers of glass or plastic together. For example, the adhesive can be used with advantage in the production of display screens, including liquid crystal displays as a perimeter seal, and waveguides wherein the adhesive is used to bond mutilple layers of glass or plastic together.

The pressure sensitive adhesive of the present invention may be employed in the production of such devices by initially placing a layer of the adhesive material of the present invention between opposing glass or plastic layers under pressure to produce semi-rigid adhesive bonds between the layers to form a laminated structure. The laminate is then subjected to elevated temperature conditions sufficient to cure the adhesive material (e.g., at a temperature within the range of 80 to 250° C., and preferably within the range of from 80 to 125° C.) to provide sufficient crosslinking to enhance the rigidity of the resulting material.

Various fillers may be incorporated into the polymer blend to provide desired physical characteristics. For example, acetylene black may be incorporated to modify the optical properties of the polymer blend when used in connection with optical display devices. For instance, an acetylene black-filled pressure sensitive adhesive of the present invention may be employed with advantage may serve as an adhesive in the formation of wave guides in order to assist in internal reflectance of light being projected through screen layers and absorption of external light, resulting in improved optical properties.

The use of the pressure sensitive adhesive of the present invention in the production of optical displays eliminates the difficulties encountered when standard liquid adhesives (e.g., liquid epoxy adhesives) are employed to laminate adjacent layers of glass or plastic. Use of liquid adhesives requires special bracing to prevent the panels from moving prior to curing the adhesive. The use of the adhesive of the present invention in the form of a tape enables relative uniformity of thickness of the adhesive layer to be achieved, with the enhanced structural integrity of the resulting cured adhesive avoiding the need for special bracing of the display device. Further, as the pressure sensitive adhesive of the present invention can be cured at a lower temperature than is normally encountered with prior art adhesives previously used for this purpose, the risk of damage to the display screen during the curing step is minimized or eliminated.

The present invention is illustrated by the following Examples which are intended to be merely illustrative in nature and not limiting in scope.

EXAMPLE 1

A high Tg acrylic polymer (comprised of 40% by wt. .t-butyl methacrylate, 10% by wt. butyl acrylate, 20% by wt. N-vinyl-2-pyrrolidone and 30% by wt.glycidyl methacrylate) is formed in ethyl acetate solvent using a free radical initiator to a molecular weight of approximately 200,000 GPC relative to polystyrene and having a first pass glass transition temperature (Tg) of about +60° C. DSC and a second pass glass transition temperature (Tg) of approximately +90° C. DSC 32.4 pph of the resulting polymer as 40% by wt. solids in ethyl acetate solvent was blended with 24.3 pph EPON 828 epoxy resin, 8.6 pph EPON 58005 epoxy resin, 6.0 pph Ancamine 2441 and 28.7 pph ethyl acetate (as solvent). The resulting adhesive was found to bond to indium tin oxide coated polyester. N-vinyl-2-pyrrolidone was replaced with N-vinyl caprolactam. Butyl acrylate was also replaced with 2-ethyl hexyl acrylate and lauryl acrylate.

The Tg of the high Tg polymer was determined by Differential Scanning Calorimetry (DSC) analysis which measures the temperatures and heat flows associated with transitions of materials. A glass transition temperature (Tg) is observed as a baseline shift caused by a change in the heat capacity of a material. All analyses were performed on a TA Instruments DSC 2920 set up to manufacturer recommended specifications. The temperature and cell constant were calibrated with indium metal. The cell was operated with a purge of nitrogen gas. An empty aluminum pan was used as a reference material.

Samples were prepared by weighing out 5–15 mg into aluminum sample pans. A small pinhole was poked in the sample pan lids. The instrument analysis method was as follows: equilibrate at −125° C., isothermal for 2 minutes, mmp to 200° C. The observed baseline shift was analyzed using instrument software and the inflection point was reported as Tg. The same sample preparation was analyzed twice by the same instrument method and Tg values were reported as first pass and second pass.

The GPC analysis used for all determinations a Waters 717 plus auto sampler, 510 pump and column oven equipped with Phenomenex phenogel 5 u Linear and 5×10³A columns. The dried samples were weighed out to 0.01000+/−0.00010 g and dissolved in 10 mL tetrahydrofuran. The samples were filtered through a 0.45 micrometer polytetrafluooethylene filter. The injection volume of the samples was 100 microliters at an elution rate of 1.0 mL per minute through the columns maintained at 30° C. Tetrahydrofuran was used as solvent. The differential refractometer detector was a Waters model 410. The light scattering and viscometer detectors were Viscotek model T60A dual detector. The system was calibrated using polystyrene standards and using third order least square fit. All GPC calculations were performed on Viscotek software and all molecular weight determinations are polystyrene equivalent molecular weights.

EXAMPLE 2

38.39 pph of the high Tg polymer of Example 1 formed of t-butyl methacryate, butyl acrylate, N-vinyl-pyrrolidone and glycidyl methacrylate in organic solvent (40% solids) was admixed with 38.39 pph EPON 828 epoxy resin (Bisphenol A epichlorohydrin derived epoxy resin), 10.75 pph Ancamine 2441, 10.55 pph ethyl acetate as solvent and 1.92 pph acetylene black.

The adhesive was coated on a release liner to yield a 3-mil transfer adhesive dry film. The adhesive, when transferred to 2-mil polyester, produced 4 lbs/liner inch (pli) peel strength bonds to stainless steel, when pulled at 12 inches/minute, after a 5 minute dwell (PSTC #7). The adhesive, when transferred to acrylic sheeting and laminated to form a multi-ply laminated structure, was capable of being polished using standard techniques without gumming the polishing media. Laminated polished blocks were then cured at 165° F. for 2 hrs. 30 minutes and 200° F. for 1½ hours to yield a rigid viewing screen with good structural integrity.

Satisfactory thermal curable pressure sensitive adhesives were also made when N-vinyl-2-pyrrolidone was replaced with N-vinyl caprolactam. Butyl acrylate was also replaced with 2-ethyl hexyl acrylate and lauryl acrylate with success.

What is claimed is:

1. A method for the production of glass or plastic laminates, comprising applying between opposing faces of glass or plastic substrates a pressure sensitive adhesive comprised of a curable blend of at least one liquid epoxy resin and a polymer comprised of the polymerization reaction product of the following monomers:

(1) an alkyl (meth)acrylate monomer whose homopolymer has a Tg>20° C. present in an amount ranging from 20 to 80 percent by weight;

(2) optionally a $C_{1-30}$ (meth)acrylate monomer present in an amount of up to 50 percent by weight;

(3) a nitrogen-containing polar monomer present in an amount ranging from 5 to 50 percent by weight; and (4) a polymerizable epoxy-containing monomer present in an amount ranging from 5 to 50 percent by weight, said monomers being present in an amount such that the Tg of said polymer is greater than 50° C., and said at least one liquid epoxy resin being present in a weight ratio of liquid epoxy resin to said polymer of at least 1:0.5, respectively, and curing said adhesive to bond said glass or plastic substrates together.

2. The method of claim 1 wherein said nitrogen-containing monomer comprises an N-vinyl lactam monomers.

3. The method of claim 2 wherein said an N-vinyl lactam monomer is selected from the group consisting of N-vinyl-2-pyrrolidone, 5-methyl-N-vinyl-2-pyrrolidone, 5-ethyl-N-vinyl-2-pyrrolidone, 3,3-dimethyl-N-vinyl-2-pyrrolidone, 3-methyl-N-vinyl-2-pyrrolidone, 3-ethyl-N-vinyl-2-pyrrolidone; 4-methol-N-vinyl-2-pyrrolidone; 4-ethyl-N-vinyl-2-pyrrolidone; N-vinyl-2-valerolactam; N-vinyl-2-caprolactam; N-vinyl-2-piperidone; N,N-dimethylacrylamide and mixtures thereof.

4. The method of claim 1 wherein said $C_{1-30}$ (meth) acrylate monomer is an ester of (meth)acrylic acid with a non-tertiary alcohol selected from the group consisting of 1-butanol, 1-pentanol, 2-pentanol, 3-pentanol, 2-methyl-1-butanol, 1-methyl-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol and octadecanol.

5. The method of claim 1 wherein said alkyl (meth) acrylate monomer is selected from the group consisting of t-butyl (meth)acrylate, hexadecyl acrylate, isobornyl (meth)

acrylate, cyclododecyl acrylate, methyl methacrylate, secondary butyl methacrylate, ethyl methacrylate, cyclohexyl methacrylate and mixtures thereof.

6. The method of claim 1 wherein said epoxy resin comprises a glycidyl monomer.

7. The method of claim 1 wherein the Tg of said polymer is at least 60° C.

8. The method of claim 1 wherein said alkyl (meth) acrylate is present in said polymer in an amount ranging from about 40 to 80 about percent by weight.

9. The method of claim 1 wherein said $C_{1-30}$ (meth) acrylate monomer is present in said polymer in an amount ranging from 0 to about 10 percent by weight.

10. The method of claim 1 wherein said adhesive is applied to the perimeter of opposing substrates of a liquid crystal display.

11. The method of claim 1 wherein said adhesive is applied to substantially the entirety of opposing surfaces of glass or plastic substrates.

12. The method of claim 11 wherein said adhesive is applied to substantially the entirety of opposing surfaces of glass or plastic in the formation of a waveguide.

13. The method of claim 12 wherein carbon black is admixed with said adhesive.

14. The method of claim 1 wherein said adhesive is thermocured.

15. The method of claim 1 wherein said adhesive is UV cured.

16. The method of claim 1 wherein said liquid epoxy resin is present in a weight ratio of liquid epoxy resin to polymer of 1:0.5 to 1:0.1, respectively.

* * * * *